United States Patent
Caspi

(12) 
(10) Patent No.: US 10,016,928 B2
(45) Date of Patent: Jul. 10, 2018

(54) RING MOLD AND METHOD OF USE

(71) Applicant: Alex Toys, LLC, Northvale, NJ (US)

(72) Inventor: Liah Caspi, Closter, NJ (US)

(73) Assignee: Alex Toys, LLC, Northvale, NJ (US)

( * ) Notice: Subject to any disclaimer, the term of this patent is extended or adjusted under 35 U.S.C. 154(b) by 686 days.

(21) Appl. No.: 14/556,578

(22) Filed: Dec. 1, 2014

(65) Prior Publication Data

US 2016/0151963 A1 Jun. 2, 2016

(51) Int. Cl.
| | | |
|---|---|---|
| B29C 41/00 | (2006.01) | |
| B29C 61/02 | (2006.01) | |
| B29K 25/00 | (2006.01) | |
| B29K 105/02 | (2006.01) | |
| B29K 105/00 | (2006.01) | |
| B29L 31/00 | (2006.01) | |

(52) U.S. Cl.
CPC .......... B29C 61/02 (2013.01); *B29K 2025/06* (2013.01); *B29K 2105/02* (2013.01); *B29K 2105/256* (2013.01); *B29L 2031/743* (2013.01)

(58) Field of Classification Search
CPC ... B29C 61/025; B29C 33/033; B29C 31/002; B29C 33/0016; B29C 57/00; B29K 2105/02; Y10T 29/49593
See application file for complete search history.

(56) References Cited

U.S. PATENT DOCUMENTS

| | | |
|---|---|---|
| 118,169 A | 8/1871 | Tinsley et al. |
| 433,879 A | 8/1890 | Sullivan |
| 746,944 A | 12/1903 | Ford |
| 3,406,430 A | 10/1968 | Furstenburg et al. |
| 4,013,259 A | 3/1977 | Tryon |
| 4,102,456 A | 7/1978 | Morris |
| 4,218,420 A | 8/1980 | Jacob et al. |
| 5,718,278 A | 2/1998 | Baum |
| 5,916,271 A | 6/1999 | Baum |
| 5,979,537 A | 11/1999 | Baum |
| 6,032,719 A | 3/2000 | Baum |
| 6,123,141 A | 9/2000 | Baum |
| 6,157,865 A | 12/2000 | Cromett |
| 6,299,818 B1 | 10/2001 | Hakinson |
| 6,435,255 B1 | 8/2002 | Kaladjian |
| 6,470,571 B1 | 10/2002 | Namiki |
| 7,409,763 B2 | 8/2008 | Pratt |
| 2007/0278711 A1 | 12/2007 | Levi |
| 2008/0022718 A1 | 1/2008 | Pratt |
| 2010/0263408 A1 | 10/2010 | Kim |

*Primary Examiner* — Stella K Yi

(74) *Attorney, Agent, or Firm* — Howson & Howson LLP

(57) ABSTRACT

A decorated strip of coated, heat-shrinkable, plastic sheet material is placed on a mold comprising a cylindrical mold body, and attachment means, preferably in the form of two parallel pins extending toward the cylindrical mold body from a pin-supporting wall, and with their ends remote from the wall spaced a short distance from the cylindrical mold body. Holes adjacent the ends of the strip are engaged with the pins. Upon heating in an oven, the strip shrinks, forming a resiliently expansible finger ring, which can be removed from the mold by disengagement from the pins.

6 Claims, 2 Drawing Sheets

US 10,016,928 B2

RING MOLD AND METHOD OF USE

FIELD OF THE INVENTION

This invention relates to hobby crafts, and particularly to a mold and the use of the mold to produce a finger ring from a decorated strip of coated, heat-shrinkable, polystyrene film.

BACKGROUND OF THE INVENTION

For about forty years, a popular hobby craft activity for both children and adults has been the production of three-dimensional objects from a heat-shrinkable sheet material known by the trademark SHRINKY DINKS, a registered trademark of K & B Innovations, Inc. The material consists of a sheet of thin plastic material that can be colored and/or cut out, and then heated to cause it to shrink and form thickened and hardened art forms. Typically the plastic sheet material is composed of a heat-shrinkable polystyrene base material coated with a water-insoluble, ink-receptive coating. The sheet material and some of its uses are described in U.S. Pat. No. 4,102,456, granted Jul. 25, 1978, and U.S. Pat. No. 6,157,865, granted Dec. 5, 2000. Coatings for the base material are described in U.S. Pat. No. 3,889,270 granted Jun. 10, 1975, U.S. Pat. No. 4,503,111 granted Mar. 5, 1985, U.S. Pat. No. 4,555,437 granted Nov. 26, 1985, U.S. Pat. No. 5,190,805 granted Mar. 2, 1993 and U.S. Pat. No. 5,206,071, granted Apr. 27, 1993. The disclosures of all of the aforementioned United States patents are incorporated by reference.

As supplied, the plastic sheet material is usually flat, and accordingly, to form a wristband, bracelet, finger ring, or the like, from a decorated strip of such material, it would be necessary to provide for a connection of one end of the strip to the other end. Heating the strip will cause it to curl, but, because shrinkage takes place unevenly, the result is usually not aesthetically acceptable.

There has been a need for a simple, convenient, and reliable way to utilize SHRINKY DINK sheet material to produce wearable jewelry in the nature of finger rings.

SUMMARY OF THE INVENTION

The mold according to the invention comprises a mold form having a cylindrical outer surface, and attachment means, connected to the mold form, for temporarily securing, to the mold form, opposite ends of a strip of heat-shrinkable film loosely wrapped part way around the mold form.

In a preferred form, the mold comprises a base, and a mold form integral with the base. The cylindrical outer surface of the mold form is defined by a generatrix parallel to a cylinder axis extending upward from the base. A wall also extends upward from the base, the wall having a surface facing, and in opposed, spaced, relationship to, the cylindrical outer surface of the mold form. Two pins extend, preferably in parallel relationship to each other, from the wall toward the outer surface of the mold form. The ends of the pins remote from the wall are disposed in opposed, closely spaced, relationship to the cylindrical outer surface of the mold form.

Preferably the mold form, the wall and the pins are in the form of a unitary molded part composed of silicone rubber.

In making a finger ring, an elongated strip of heat-shrinkable sheet material having two opposite ends is attached to the mold form by wrapping the strip part way around the mold form, and attaching its opposite ends to the mold form by the attachment means. The strip is heated while attached to the mold form, and thereby caused to shrink to a size such that it assumes a resilient arcuate shape conforming to, and fitting closely on, the cylindrical outer surface of the mold form. After heating and shrinking, the strip is removed from the mold form and can be expanded to receive an individual's finger. The strip contracts, by reason of its resilience, to fit snugly onto the individual's finger.

When the attachment means comprises two pins extending from the wall toward the mold form, attachment of the opposite ends of the strip to the mold form can be carried out by inserting one of the ends of the strip through a space between an end of one of the pins and the mold form, inserting said one of said pins through the hole in the strip adjacent said one of the ends thereof, inserting the other one of the ends of the strip through a space between an end of the other one of the pins and the mold form, and inserting said other of said pins through the hole in the strip adjacent said other one of the ends thereof.

After heating and shrinking of the strip, the strip can be released from the mold form by disengaging the pins from the holes in the strip and passing the strip through the gaps between the ends of the pins and the cylindrical outer surface of the mold form.

DETAILED DESCRIPTION OF THE PREFERRED EMBODIMENTS

Figure 1:
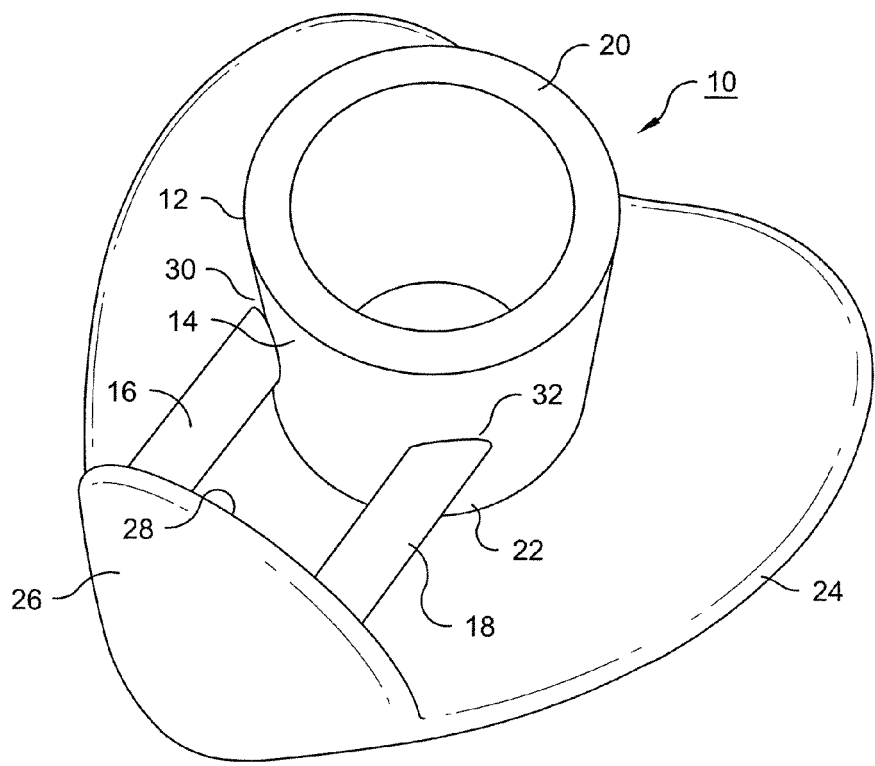
FIG. 1 is a perspective view of a mold in accordance with the invention.

As shown in FIG. 1, the mold 10 in accordance with the invention comprises a mold form 12 having a cylindrical outer surface 14, i.e., a surface defined by a movement in a closed path, of a straight generatrix that remains parallel to a cylinder axis. Preferably, the cylindrical outer surface is in the form of a circular cylinder. However, departures from a circular cross-section can be taken. For example, the cylinder can have an elliptical cross-section or an oval cross-section.

Two pins, 16 and 18, which are integral with the mold form, extend in parallel relationship to each other toward an intermediate location between an upper end 20 and a lower end 22 of the mold form. The pins extend from a supporting wall in a direction orthogonal to the direction of the axis of the cylinder. As explained below, the pins and supporting wall serve as attachment means for temporarily securing, to the mold form, opposite ends of a heat shrinkable strip loosely wrapped part way around the mold form.

The mold also includes a base 24, which is also integral with the cylindrical mold form. The cylindrical mold form extends upward from the base. A wall 26 also extends upward from the base, and has a surface 28 that faces, and is spaced from, the cylindrical outer surface 14 of the mold form. The pins 16 and 18 are unitary with the wall, and extend from surface 28 of the wall toward the cylindrical outer surface of the mold form. However, the ends of the pins remote from the wall are spaced from surface cylindrical outer surface of the mold form by a short distance, leaving gaps 30 and 32 through which a flexible strip of heat-shrinkable film can be inserted. The ends of the pins facing the mold form are preferably shaped as portions of a cylinder having the same shape as, but slightly larger than, the outer surface of the mold form, so that the gaps have a uniform width. Upon shrinking, the length of the heat-shrinkable film will decrease greatly. However, the thickness of the film will increase. The width of the gaps should be slightly greater than the thickness of the heat-shrinkable film after shrinking.

When used to shape a flexible, heat-shrinkable strip, the mold is heated in an oven. The mold 10 is therefore preferably composed entirely of silicone rubber, and formed as a unitary molded part. Most silicone rubbers will withstand typical household oven temperatures which can exceed 230° C. (446° F.), and high heat resistant silicone rubbers are available that will withstand considerably higher temperatures.

Figure 2:
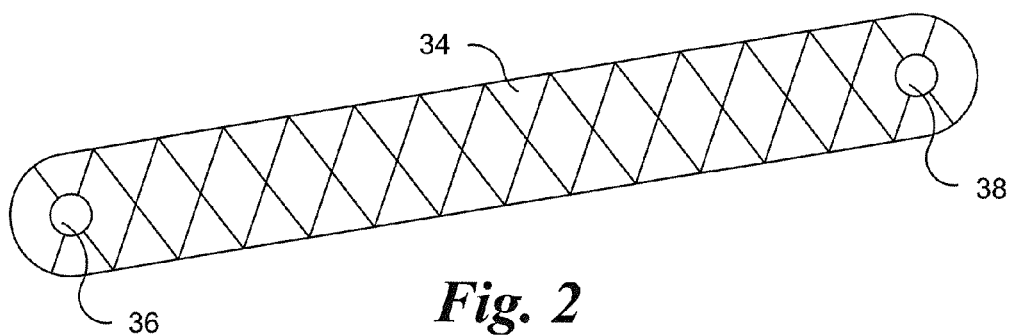
FIG. 2 is a plan view of a heat-shrinkable strip of sheet material for use in making a ring.

FIG. 2 shows a decorated flexible strip 34 of heat-shrinkable material, preferably a sheet of polystyrene film serving as a base material and having an ink-receptive coating that makes it possible for a user to decorate the strip using ink applied with a pen or a brush. An alternative way to produce decorated strips comprises passing a sheet of coated heat-shrinkable material through an ink jet printer driven by a computer so that an image in the computer memory, or a computer-generated pattern, is reproduced on the sheet, and then cutting the sheet into strips.

The strip 34 in FIG. 2 is an elongated strip preferably having rounded ends and having punched holes 36 and 38 adjacent its ends.

Figure 3:
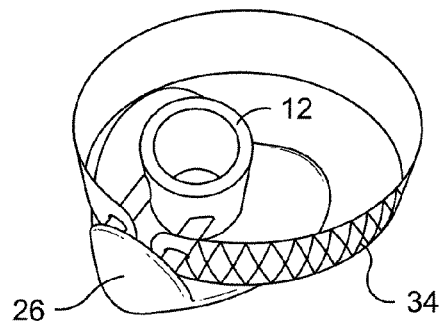
FIG. 3 is a perspective view illustrating the attachment of the shrinkable strip of sheet material to the mold prior to the heat-shrinking step.
Figure 4:
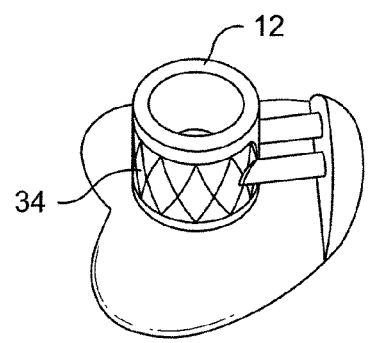
FIG. 4 is a perspective view showing the strip of material on the mold following the heat-shrinking step.

To make a ring, a user can first decorate the coated strip 34, and then secure the strip to the mold form by moving one of the ends of the strip through gap 30 between the end of pin 16 and the surface 14 of the mold form 12 and then moving the strip to cause pin 16 to pass through a hole in the strip adjacent that end of the strip. Then, the opposite end of the strip is inserted through gap 32, and the strip is moved so that pin 18 extends through the other hole in the strip. The strip is typically transparent, and therefore the decorated side of the strip can face either toward or away from the mold form. As shown in FIG. 3, the decorated strip extends loosely around the mold form 12, and is held to the mold form by the insertion of the pins of the mold through the holes in the strip.

The mold with the strip attached to it as shown in FIG. 3, is placed in an oven (which can be a conventional baking oven or a toaster oven), preheated to a temperature of 177° C. (350° F.), and allowed to bake for 6-7 minutes. Upon removal, the strip will have shrunk so that it conforms to, and fits closely on, the mold form.

Figure 5:
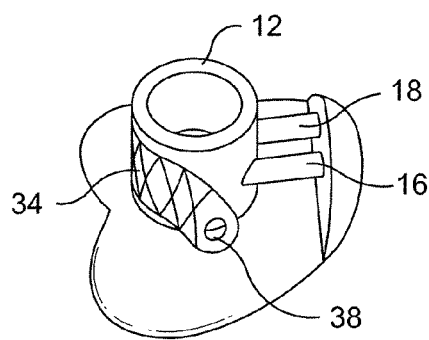
FIG. 5 is a perspective view illustrating the removal of the strip of material from the mold following the heat-shrinking step.
Figure 7:
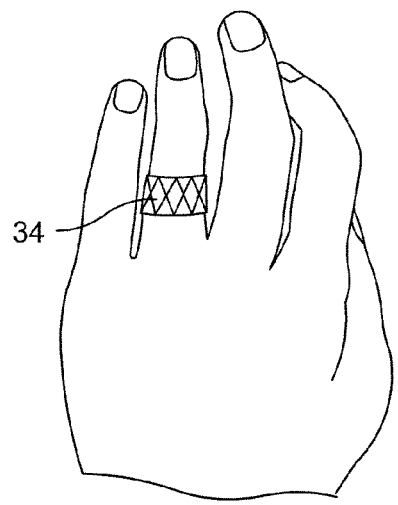
FIG. 7 is a perspective view showing the completed ring worn on an individual's finger.
Figure 6:
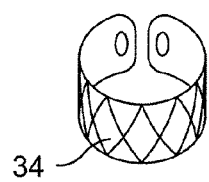
FIG. 6 is a perspective view of the ring removed from the mold after heat treatment.

The strip can be removed from the mold form as shown in FIG. 5. When removed, the ring is resilient and has an arcuate shape, subtending an angle greater than 180°, typically around 350° as shown in FIG. 6, so that the two ends of the strip are close to each other. Because of its resilience, the ring can be expanded slightly to receive the wearer's finger, and will contract to fit snugly on the finger as shown in FIG. 7.

If the mold form is a circular cylinder, its diameter is typically approximately 15 mm (0.6 inch). The length of the flexible strip is typically about 120 mm (4.75 inches). These dimensions may be varied somewhat, depending on the age group for which the mold and shrinkable strips are intended.

In a modified version of the mold, the pins can be directly joined to the cylindrical outer surface of the mold form and have their opposite ends approaching but spaced from the surface 28 of wall 26. In this version, engagement of the ends of the strip with the wall prevents the strip from disengaging from the pins before and during heating of the strip. The pins, being composed of silicone rubber, are inherently flexible. Therefore, after shrinking, the strip can be removed from the mold by bending one of the pins.

Various other modifications can be made to the mold and heat-shrinkable strip described above. For example, as mentioned previously, the mold form does not need to have a circular cross-section, and other shapes such as elliptical or oval shapes can be utilized. However it is desirable that the cross-section of the mold form be circular or nearly circular so that the ring formed on it will have the shape of a circular arc. The wall and the base, of course, can have any of a wide variety of shapes. The attachment means, although preferably composed of a wall and parallel, flexible pins as shown in FIG. 1, can have any of various sizes and configurations, it being necessary only that it is capable of retaining the heat-shrinkable strip on the mold before and during heating, and of releasing the strip after shrinking. For example the pins do not need to have circular cross-sections, and they can converge toward each other instead of being parallel. Many other modifications can be made to the ring mold described herein without departing from the scope of the invention as defined in the following claims.

What is claimed is:

1. A process for making a finger ring comprising:
attaching, to a mold, an elongated strip of heat-shrinkable sheet material having two opposite ends;
said mold comprising a mold form having a cylindrical outer surface, and attachment means, connected to said mold form, for temporarily securing, to the mold form, opposite ends of a strip of heat-shrinkable film loosely wrapped part way around said mold form;
said attaching step being carried out by wrapping said strip part way around said mold form, and attaching said opposite ends of said strip to the mold form by said attachment means; heating said strip while said strip is attached to said mold form, thereby causing said strip to shrink to a size such that it assumes a resilient arcuate shape conforming to, and fitting closely on, the cylindrical outer surface of the mold form; and releasing said strip from said mold form; whereby said strip, when removed from said mold form, can be expanded to receive an individual's finger, and contracts by reason of its resilience to fit snugly onto said individual's finger;
wherein:
said elongated strip of heat-shrinkable sheet material has a hole through said strip adjacent each of its opposite ends;
said mold comprises a base;
said mold form is integral with said base and its cylindrical outer surface is symmetrical about a cylinder axis extending upward from said base, said attachment means comprises a pair of pins integral with, supported from, and in spaced relation to said base, each said pin extending toward said mold form and having an end disposed in opposed, spaced, relationship to said cylindrical outer surface of the mold form; and the attachment of said opposite ends of the strip to the mold form is carried out by inserting one of the ends of said strip through a space between the said end of one of said pins and said cylindrical outer surface of the mold form, inserting said one of said pins through the hole in said strip adjacent said one of the ends of said strip, inserting the other one of the ends of said strip through a space between the said end of the other one of said pins and said cylindrical outer surface of the mold form, and inserting said other of said pins through the hole in said strip adjacent said other one of the ends of said strip.

2. The process according to claim 1, in which said pins are in parallel relationship to each other.

3. The process according to claim 1, in which said mold also comprises a wall integral with, and extending upward from, said base, said wall having a surface facing, and in opposed, spaced, relationship to, said cylindrical outer surface of the mold form, and in which said pair of pins extend from said surface of the wall toward said mold form.

4. The process according to claim 3, in which said base, mold form, wall and pins are composed of silicone rubber.

5. The process according to claim 3, in which said base, mold form, wall and pins are a unitary molded part.

6. The process according to claim 3, in which said base, mold form, wall and pins are a unitary molded part composed of silicone rubber.

* * * * *